(12) United States Patent
Bungo

(10) Patent No.: US 7,162,594 B2
(45) Date of Patent: Jan. 9, 2007

(54) MEMORY MODULE INDICATOR DEVICE

(75) Inventor: Motohiko Bungo, Aichi-ken (JP)

(73) Assignee: Buffalo Inc., Nagoya (JP)

( * ) Notice: Subject to any disclaimer, the term of this patent is extended or adjusted under 35 U.S.C. 154(b) by 194 days.

(21) Appl. No.: 10/717,081

(22) Filed: Nov. 19, 2003

(65) Prior Publication Data

US 2005/0108483 A1    May 19, 2005

(51) Int. Cl.
*G06F 12/00* (2006.01)

(52) U.S. Cl. ..................... 711/156; 711/115

(58) Field of Classification Search ............. 710/17; 714/36, 46; 365/200; 377/16; 715/700; 711/115, 156
See application file for complete search history.

(56) References Cited

U.S. PATENT DOCUMENTS

| | | | | |
|---|---|---|---|---|
| 3,904,861 | A * | 9/1975 | McNamara ................ | 714/736 |
| 4,089,063 | A * | 5/1978 | Takezono et al. ......... | 365/200 |
| 4,180,724 | A * | 12/1979 | Councilman et al. ...... | 377/16 |
| 4,360,915 | A * | 11/1982 | Sindelar .................. | 714/54 |
| 4,360,917 | A * | 11/1982 | Sindelar et al. .......... | 714/805 |
| 4,919,030 | A * | 4/1990 | Perron, III ............... | 84/470 R |
| 5,214,762 | A * | 5/1993 | Bush et al. ............... | 710/17 |
| 5,327,435 | A * | 7/1994 | Warchol .................. | 714/36 |
| 5,519,832 | A * | 5/1996 | Warchol .................. | 714/46 |
| 5,774,647 | A * | 6/1998 | Raynham et al. ......... | 714/48 |
| 6,075,535 | A * | 6/2000 | Fitzhugh et al. .......... | 715/700 |
| 2005/0028068 | A1* | 2/2005 | Larson et al. ............ | 714/764 |

FOREIGN PATENT DOCUMENTS

| | | | |
|---|---|---|---|
| JP | 09-128511 | | 5/1997 |
| JP | 09212615 | A * | 8/1997 |
| JP | 13-266098 | | 9/2001 |

* cited by examiner

*Primary Examiner*—Pierre Bataille
*Assistant Examiner*—Paul Schlie
(74) *Attorney, Agent, or Firm*—Peter Ganjian

(57) ABSTRACT

To improve the convenience of using a memory module, there are provided indicator elements corresponding to types of access to semiconductor memory. The indicator elements are configured to correspond to the access type and indicate the frequency of this type of access to the semiconductor memory. The indicator elements are also configured to indicate the frequency of access to the semiconductor memory and hold an indication corresponding to the maximum frequency of the access. Furthermore, the indicator elements are configured to indicate the frequency of access to the semiconductor memory when a connection terminal 22 is connected to a motherboard connector 91 and a memory module connection terminal 82 is connected to a connector 23.

8 Claims, 20 Drawing Sheets

FIG.2
BANK1
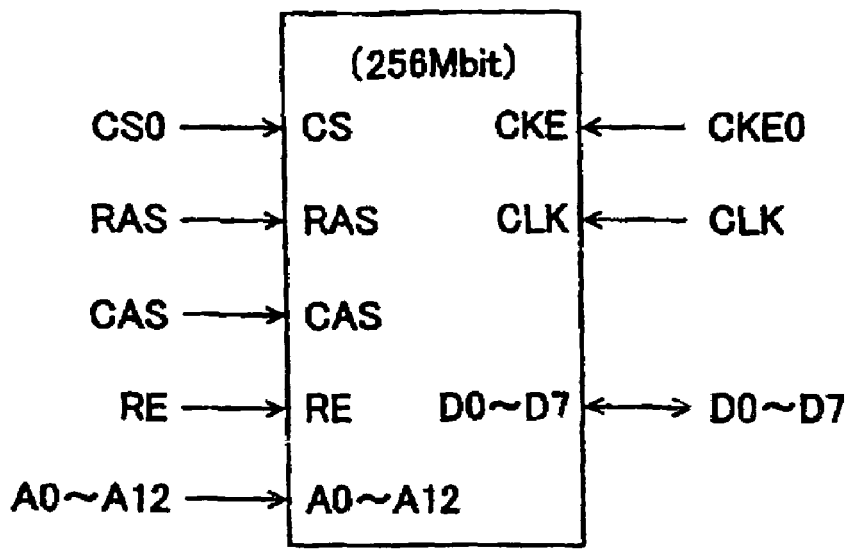
BANK2
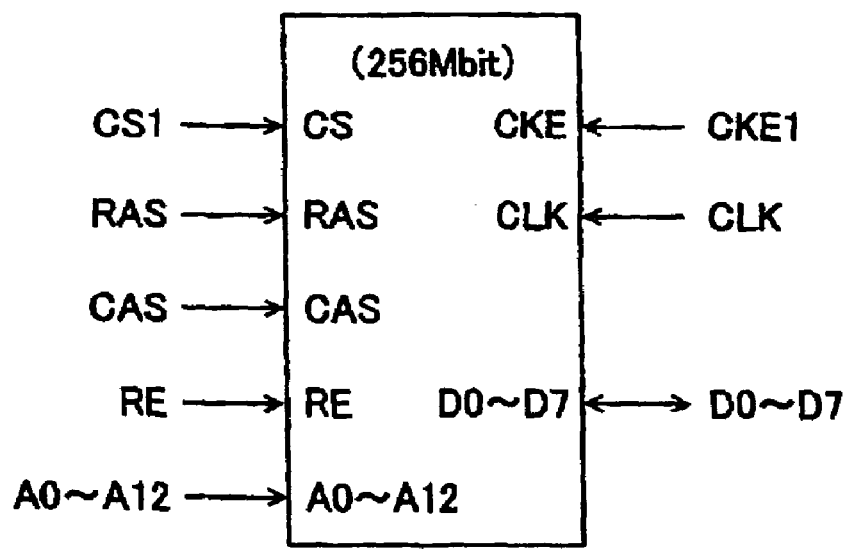

| Counter | Output |
|---------|--------|
| 0 0 0 0 | MASK → L |
| 0 0 0 0 | LEDCLK → H |
| 0 0 0 0 | CLR → H |
| 0 0 0 0 | READL_WRITH → L |
| 0 0 0 1 | LEDCLK → L |
| 0 0 0 2 | LEDCLK → H |
| 0 0 0 2 | CLR → L |
| 0 0 0 3 | CLR → H |
| 0 0 0 3 | MASK → H |
| 8 0 0 0 | MASK → L |
| 8 0 0 0 | READL_WRITH → H |
| 8 0 0 1 | LEDCLK → L |
| 8 0 0 2 | LEDCLK → H |
| 8 0 0 2 | CLR → L |
| 8 0 0 3 | CLR → H |
| 8 0 0 3 | MASK → H |

FIG. 8

FUNCTION TABLE

| | Input | | | | | Output |
|---|---|---|---|---|---|---|
| CS | RAS | CAS | WE | READL_WRITH | | CMD_EN |
| H | X | X | X | X | | L |
| L | L | X | X | X | | L |
| L | X | H | X | X | | L |
| L | H | L | H | H | | L |
| L | H | L | H | L | | H |
| L | H | L | L | H | | H |
| L | H | L | L | L | | L |

FIG. 10

FUNCTION TABLE

| Input | | | | Output |
|---|---|---|---|---|
| CMD_EN | MASK | CLR | CLK | CMD_D |
| X | X | L | X | All bit "0" |
| L | L | H | X | Stop count |
| H | L | H | X | |
| L | H | H | X | |
| H | H | H | ⤒ | Increment count 0000000000← 0000000001 ↓ 1111111110 1111111111 ⤶ |

FIG. 17

FUNCTION TABLE

| Input | Output | | | | | | | |
|---|---|---|---|---|---|---|---|---|
| CMD_D | DER0 | DER1 | DER2 | DER3 | DER4 | DER5 | DER6 | DER7 |
| CMD_D≦m0 | L | L | L | L | L | L | L | L |
| m0<CMD_D≦m1 | H | L | L | L | L | L | L | L |
| m1<CMD_D≦m2 | H | H | L | L | L | L | L | L |
| m2<CMD_D≦m3 | H | H | H | L | L | L | L | L |
| m3<CMD_D≦m4 | H | H | H | H | L | L | L | L |
| m4<CMD_D≦m5 | H | H | H | H | H | L | L | L |
| m5<CMD_D≦m6 | H | H | H | H | H | H | L | L |
| m6<CMD_D≦m7 | H | H | H | H | H | H | H | L |
| m7<CMD_D | H | H | H | H | H | H | H | H |

FIG. 18

FUNCTION TABLE

| READL_WRITH | DERi | RLEDi | KEEP | $\overline{RLEDj}$ | LEDCLK | RLEDi |
|---|---|---|---|---|---|---|
| Input | | | | | | Output |
| X | X | X | L | X | X | L |
| L | X | X | H | X | X | RLEDi |
| H | L | L | H | X | ↑ | L |
| H | H | X | H | X | ↑ | H |
| H | L | H | H | X | ↑ | H |
| H | L | H | H | ALL H (L) | ↑ | L |

$j = i+1 \sim 7$

FIG. 19

FUNCTION TABLE

| READL_WRITH | DEWi | WLEDi | KEEP | $\overline{WLEDj}$ | LEDCLK | WLEDi |
|---|---|---|---|---|---|---|
| \multicolumn{6}{c}{Input} | Output |
| X | X | X | L | X | X | L |
| H | X | X | H | X | X | WLEDi |
| L | L | L | H | X | ↑ | L |
| L | H | X | H | X | ↑ | H |
| L | L | H | H | ALL H | ↑ | H |
| L | L | H | H | (L) | ↑ | L | j=i+1~7

MEMORY MODULE INDICATOR DEVICE

BACKGROUND OF THE INVENTION

1. Field of the Invention

The present invention relates to a memory module indicator device.

2. Description of the Prior Art

Conventionally, it has been a general practice to expand computer memory by connecting a standardized memory module to a general-purpose slot (socket) on a computer body. Available memory modules include, e.g., a 256-Mbyte DIMM (Dual Inline Memory Module) comprising eight 256-Mbit SDRAM (Synchronous Dynamic Random Access Memory) chips. Normally, the 256-Mbit SDRAM is provided with 13 address signal terminals A0 through A12 capable of connecting 13 row address signal lines and 10 column address signal lines. When the computer supplies address signals A0 through A12, data can be read and written to the corresponding addresses of all 256-Mbit areas in the entire SDRAM.

There is also known a memory card with access indicator as disclosed in JP-A No. 128511/1997. This memory card has an LED. When an R/W control signal becomes active, a timer starts to turn on the LED mounted on the memory card for 0.1 seconds. Here, the R/W control signal becomes active when data is read or written to the memory card. The LED lights independently of types of read and write operations.

Further, there is also known an IC card as disclosed in JP-A No. 266098/2001. This IC also has LEDs. As described in paragraph 0039 of JP-A No. 266098/2001, LEDs operate in response to an access request from a host apparatus. That is to say, a red LED and a green LED blink alternately each time operations to delete, write, read, or verify data are issued. Also on this IC card, the LEDs light independently of types of read and write operations.

On a conventional memory module, it has been difficult to know whether or not the mounted semiconductor memory operates.

The technologies disclosed in. JP-A No. 128511/1997 and JP-A No. 266098/2001 indeed make it possible to notify whether or not a memory card or an IC card is accessed. However, the technologies are sometimes still inconvenient because they cannot indicate what type of access is occurring. Further, the LED indications are hard to understand and therefore not necessarily convenient, making it difficult to keep track of states of access to the semiconductor memory. In addition, it is not easy to confirm operations of the semiconductor memory built in a memory card or an IC card having no indicator element, sometimes causing inconvenience to users.

SUMMARY OF THE INVENTION

The present invention has been made in consideration of the foregoing. It is therefore an object of the present invention to provide a memory module indicator device capable of improving convenience of using memory modules.

To achieve the above-mentioned objective, the present invention provides a memory module indicator device having an indicator circuit using an indicator element to indicate situation of access to readable and writable semiconductor memory mounted on a standardized memory module connected to a computer, wherein the indicator element is provided corresponding to a type of access to the semiconductor memory; and wherein the indicator circuit uses the indicator element corresponding to the access type to indicate frequency of the type of access to the semiconductor memory.

There are provided indicator elements corresponding to access types to indicate the frequency of the corresponding type of access to the semiconductor memory. It becomes possible to show which type of access is made to the semiconductor memory mounted on the memory module.

As mentioned above, the present invention makes it possible to show which type of access is made to the semiconductor memory mounted on the memory module and to improve the convenience of using the memory module.

When the indicator elements comprise light emitting elements such as LEDs (Light Emitting Diodes) and fluorescent character indicator tubes, it is possible to easily confirm an indication corresponding to the access frequency even in a dark place. If the indicator elements comprise nonluminous elements such as LCDs (Liquid Crystal Displays), the indication can be confirmed in a light place. Providing a backlight makes it possible to easily confirm the indication even in a dark place.

The available access types include not only writing or reading from the semiconductor memory, but also deleting data from the semiconductor memory, verifying data, and the like.

The semiconductor memory may be RAM such as DRAM and SRAM.

Further, the present invention provides a memory module indicator device having a indicator circuit using an indicator element to indicate situation of access to readable and writable semiconductor memory mounted on a standardized memory module connected to a computer, wherein the indicator circuit uses the indicator element to indicate a frequency of access to the semiconductor memory and holds an indication corresponding to the maximum frequency of the access.

That is to say, the indicator elements indicate the frequency of access to the semiconductor memory and holds the indication corresponding to the maximum access frequency. Consequently, it becomes more easily to understand situations of access to the semiconductor memory. It is possible to easily keep track of situations of access to the semiconductor memory.

The above-mentioned configuration makes it possible to more easily understand situations of access to the semiconductor memory. It becomes possible to improve the convenience of using memory modules according to various embodiments.

Moreover, the present invention provides a memory module indicator device which uses an indicator element to indicate a situation of access to readable and writable semiconductor memory mounted on a standardized memory module having a memory module connection terminal connectable to a general-purpose motherboard connector provided on a computer, the device comprising: a connection terminal having the same shape as the memory module connection terminal; a connector having the same shape as the motherboard connector; and a indicator circuit which uses the indicator element to perform indication corresponding to the frequency of access to the semiconductor memory when the connection terminal is connected to the motherboard and the memory module connection terminal is connected to the connector.

That is to say, a memory module having no indicator element can be connected to the computer via the memory module indicator device. The indicator elements can be used to indicate the frequency of access to the semiconductor memory. In this manner, the corresponding access frequency can be indicated for various memory modules.

The above-mentioned configuration allows a memory module having no indicator element to indicate the frequency of access to the semiconductor memory. It is possible to improve the convenience of using memory modules.

The memory module indicator device may be configured to further comprise: a printed wiring board which has the connection terminal formed and is mounted with the connector; a signal cable connected to and extended from the printed wiring board; and a indicator unit which is connected to the extended signal cable and is mounted with the indicator element.

The above-mentioned configuration allows the indicator elements to be disposed freely. It is possible to further improve the convenience of using memory modules.

The indicator circuit may be configured to count the number of accesses to the semiconductor memory correspondingly to the access types during a specified period. The number of counted accesses may be indicated by the indicator elements corresponding to the access type. In this case, the number of counted accesses is equivalent to the access frequency.

It is possible to provide a simple configuration to indicate the access frequency.

To indicate the access frequency in a more understandable manner, it is a good practice to reset the count after indicating the number of counted accesses, and again count and indicate the number of counted accesses during the specified period.

The indicator circuit may activate indicator elements corresponding to the access types as many indicator elements as the number of counted accesses. The semiconductor memory is accessed much faster than magnetic recording media such as hard disks. If the access frequency corresponds to the number of indicator elements to be activated, the access frequency can be identified at a glance on very fast accessing semiconductor memory.

The above-mentioned configuration enables to identify the frequency of accesses to the very fast accessing semiconductor memory at a glance, further improving the convenience.

The indicator circuit may generate a count signal whose state accordingly varies with the access type. During the specified period, the indicator circuit may use a common counter circuit to count the number of accesses of the type corresponding to a state of the count signal. After termination of the specified period, the indicator circuit may use the indicator element corresponding to the access type to perform indication corresponding to the number of counted accesses.

According to the above-mentioned configuration, the same counter circuit can be used to count the number of accesses independently of access types. It is possible to simplify the counter circuit.

This configuration can be implemented by using a clock signal, a select signal, and a write enable signal supplied to the memory module.

The configuration can simplify the counter circuit. In addition, the counter circuit can operate independently of clock signal frequencies because the circuit operates in synchronization with clock signals for the memory module.

Further, it may be preferable to provide a releasing divider circuit.

This configuration periodically releases the held indication of the maximum access frequency. The access frequency can be understood more easily. In addition, the counter circuit can operate independently of clock signal frequencies because the circuit operates in synchronization with clock signals for the memory module.

Various circuits constituting the present invention include those implemented by a programmable logic device (PLD)

BRIEF DESCRIPTION OF THE DRAWINGS

FIG. 2 partially shows 256-Mbit SDRAM terminals and signal lines connected to the terminals;

FIG. 6 shows a data table T1;

FIG. 8 shows a function table of the command decoder;

FIG. 10 shows a function table of the access counter;

FIG. 17 shows a function table of decoders DER0 through DER7;

FIG. 18 shows a function table of a read operation indicator LED decoder;

FIG. 19 shows a function table of a write operation indicator LED decoder; and

DESCRIPTION OF THE PREFERRED EMBODIMENTS

Embodiments of the present invention will be described in the following sequence.

Figure 1:
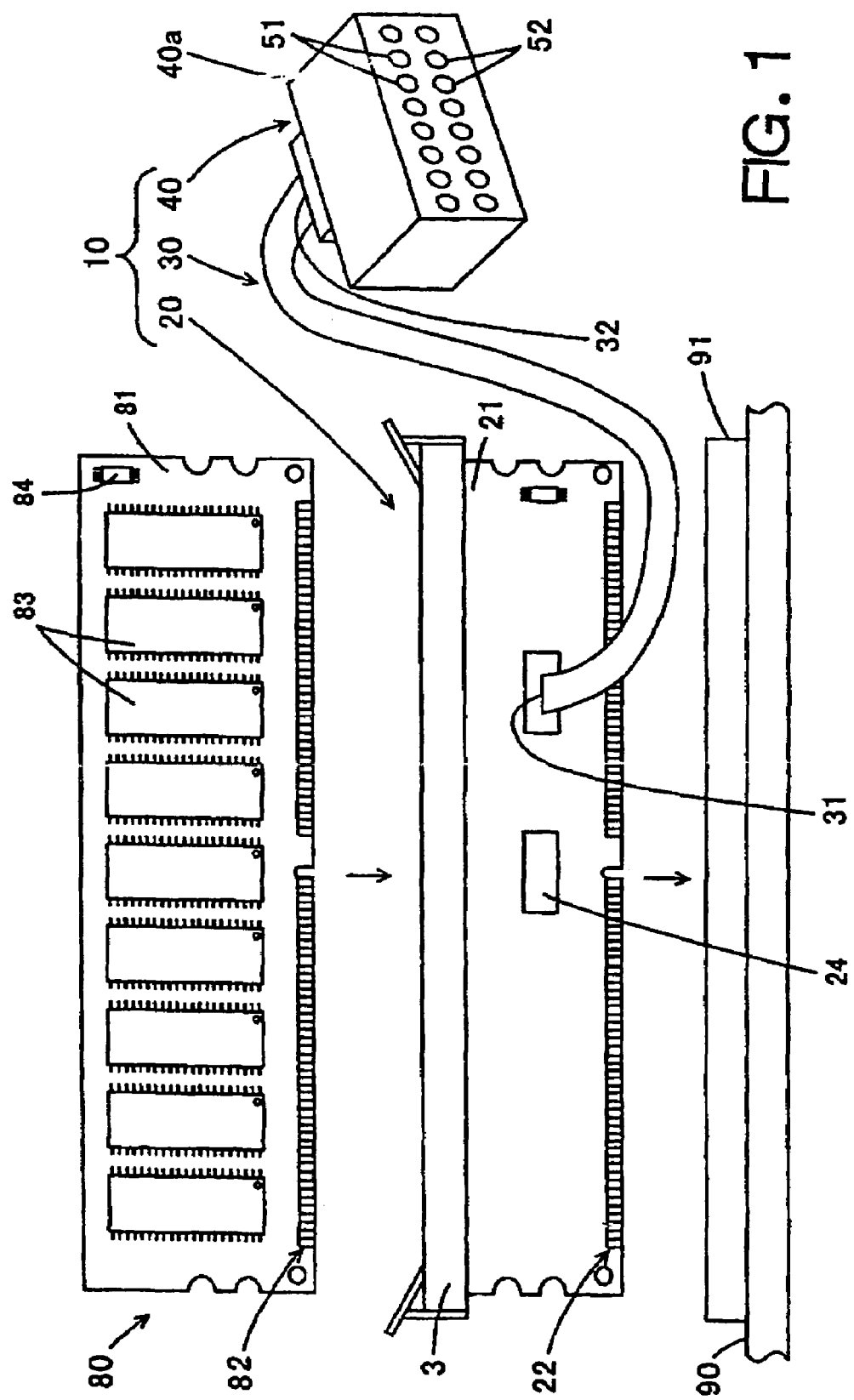
FIG. 1 is a front view showing an external view of an access indicator module.

(1) General Configuration of the Memory Module Indicator Device (2) Detailed Configuration of the Memory Module Indicator Device and Effects (3) Modifications (1) General Configuration of the Memory Module Indicator Device FIG. 1 shows an external view of an access indicator module 10, i.e., an example of the memory module indicator device according to the present invention, together with a motherboard 90 of the computer and a memory module 80.

This drawing is used as the basis of positional relationship such as top, bottom, left, and right in the following description.

A memory module 80 is a general-purpose product. A standardized printed wiring board 81 is mounted with a plurality of 256-Mbit SDRAMs (semiconductor memory capable of reading and writing) 83, EEPROM 84, and the like. A memory module connection terminal 82 is formed at the bottom edge of the printed wiring board 81. The memory module connection terminal 82 complies with the 184-pin DIMM specification having 92 pins each on the front and the rear. The memory module 80 is an expansion memory card for desktop personal computers (PCs). The memory module 80 can be connected by inserting the terminal 82 into a motherboard connector (slot) 91 on a motherboard 90 of a desktop PC (computer itself). The motherboard connector 91 is a general-purpose connector having 184 conductive portions corresponding to the arrangement of the terminal 82. The motherboard connector 91 is formed to be able to mount a standardized 184-pin DIMM. When the memory module 80 is inserted into the connector 91 from the top, the memory module 80 can be mounted almost perpendicularly to the motherboard 90 and can be connected to the desktop PC.

The access indicator module 10 comprises an adapter 20, a signal cable 30, and an indicator unit 40. The adapter 20 includes a connection terminal 22 formed on a printed circuit board 21. The adapter 20 is mounted with a connector 23 and is connected to the signal cable 30 leading to the indicator unit section 40. Further, the adapter 20 is mounted with a driver IC 24 having a buffer circuit. The connection terminal 22 complies with the 184-pin DIMM specification having 92 pins each on the front and the rear. The connection terminal 22 has the same shape as the memory module connection terminal 82. The connector 23 has the same shape as the motherboard connector 91 and is capable of mounting standardized 184-pin DIMMs. The printed circuit board 21 has a printed circuit that electrically connects pins of the connection terminal 22 with corresponding conductive portions of the connector 23.

When the adapter 20 is inserted into the connector 91 from the top, the adapter 20 can be mounted almost perpendicularly to the motherboard 90. With this state, the memory module 80 can be inserted into the connector from the top and can be mounted parallel to the printed circuit board 21. The memory module 80 is connected to the computer via the adapter 20 and operates as usual.

The signal cable 30 can represent a 10-conductor flat cable, for example. One end thereof is connected to the printed circuit board 21 and the other end 32 is connected to the indicator unit section 40.

The indicator unit section 40 has an indicator unit 40a that includes a printed circuit board (not shown). The indicator unit 40a is mounted with a plurality of LEDs (indicator elements) 51 and 52 to indicate states of access to the semiconductor memory 83 of the memory module. There is provided a plurality of LEDs 51 and 52 correspondingly to types of accesses to the semiconductor memory. More specifically, eight read operation indicator LEDs 51 are used to indicate frequency of reading from the semiconductor memory 83. Eight write operation indicator LEDs 52 are used to indicate frequency of writing to the semiconductor memory 83. The read operation indicator LEDs 51 and the write operation indicator LEDs 52 are arranged straight. The indicator unit section 40 is designed to be mounted on a PC's front panel.

The indicator circuit according to the present invention comprises the circuit included in the indicator unit section 40 and the driver IC 24. Let us assume that the connection terminal 22 is connected to the motherboard connector 91 and the memory module connection terminal 82 is connected to the connector 23. In this case, the indicator circuit uses the LEDs corresponding to the access type to indicate the frequency of corresponding type of accesses to the semiconductor memory 83. The indicator circuit also has a peak hold function to hold an indication of the maximum access frequency.

When the access indicator module 10 is made to be connectable like an adapter between the computer and the memory module, even a memory module having no indicator element can be connected to the computer via the access indicator module 10. That is to say, even a memory module having no indicator element can indicate the frequency of accesses to the semiconductor memory. This can further improve the convenience of using the memory module.

Since the indicator unit mounted with indicator elements is separated from the adapter, the indicator elements can be freely disposed, still further improving the convenience of using the memory module.

FIG. 2 partially shows 256-Mbit SDRAM (semiconductor memory) terminals and signal lines connected to the terminals. The 256-Mbit SDRAM is mounted on a memory module compliant with the 2-bank configuration. Terminal names are described inside the SDRAM. Signal names are described outside the SDRAM.

The SDRAM is connected to a power line (not shown) and is supplied with voltage. Input signals include clock signal CLK, select signal CS0 or CS1, clock enable signal CKE0 or CKE1, row address signal RAS, column address signal CAS, write enable signal WE, address signals A0 through A12, and extended address signals BA0 and BA1 (not shown). Input/output signals include data signals D0 through D7 in FIG. 2. The RAS (Row Address Strobe) signal signifies a signal that transfers timings to provide the SDRAM with row addresses. The CAS (Column Address Strobe) signal signifies a signal that transfers timings to provide the SDRAM with column addresses. The WE signal indicates whether or not writing is enabled for the semiconductor memory. The WE signal set to L (low) enables writing to the semiconductor memory. The WE signal set to H (high) disables writing thereto. The PC has a memory controller (not shown) to generate a CLK pulse signal having a specified frequency and supplies it to the memory module. The PC generates CS0, CS1, CKE0, CKE1, RAS, CAS, WE, A0 through A12, BA0, and BA1 signals, and supplies them to the signal lines in synchronization with the CLK signal. Further, the PC supplies or is supplied with 64 types of data signals D0 through D63 from the signal lines in synchronization with CLK signal timings. Sixty-four data signals lines are divided into eight sets of eight lines that are connected to each SDRAM of the memory module.

The CS0 and CS1 signals are chip select signals (select signals) to select a bank to be accessed. The CS0 and CS1 signals indicate whether or not the banks are selected. The CS0 and CS1 signals are negative logic signals, i.e., set to L (low) to indicate the selected bank state and set to H (high) to indicate the unselected bank state. The SDRAM is supplied with the CS0 or CS1 signal at the CS terminal. The CS terminal set to L (selected) enables an access corresponding to the state of the WE signal. The CKE1 and CKE2 signals are positive logic signals, i.e., set to H (high) to indicate the enabled state of the CLK signal input and set to L (low) to indicate the disabled state thereof. The CS0 and CKE0 signals are supplied to BANK1. The CS1 and CKE1 signals are supplied to BANK2. The remaining signals are supplied to both BANK1 and BANK2.

According to the above-mentioned configuration, the memory module 80 accesses the SDRAM in synchronization with the CLK pulse signal supplied from the PC. When supplied with the CS0 or CS1 indicating the SDRAM's selection state from the PC, the memory module 80 accesses the SDRAM in accordance with the state of the PC-supplied WE signal indicating whether or not the writing is enabled.

Figure 3:
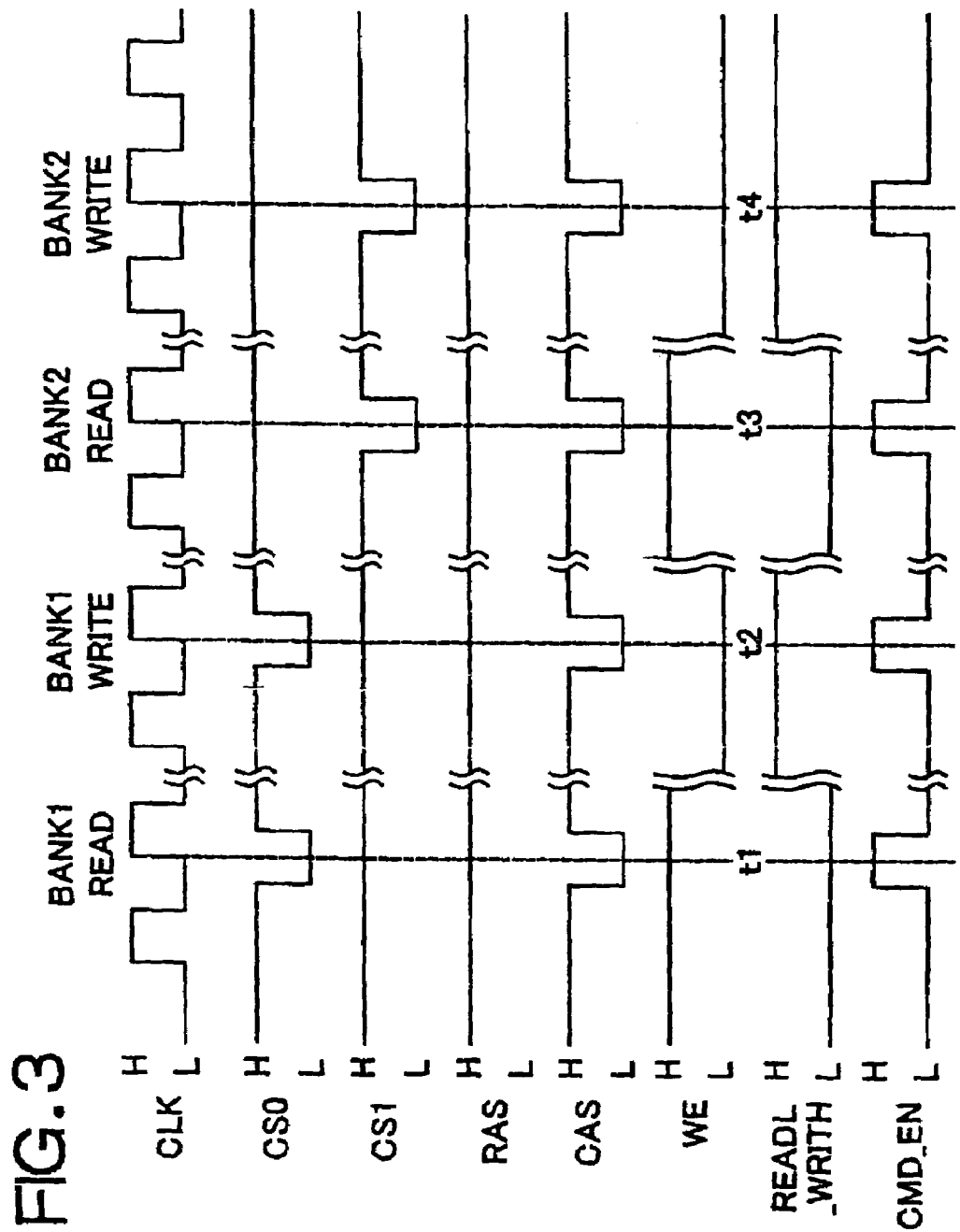
FIG. 3 is a timing chart showing timings of PC-generated READL_WRITH and CMD_EN signals.

FIG. 3 shows timings of PC-generated signals for accessing the SDRAM.

Data is read from the SDRAM in bank 1 at timing t1. When the CLK signal rises to change its state L to H, the CS0 signal is set to L; the RAS signal is set to H; the CAS signal is set to L; and the WE signal is set to H (write disabled). Data is written to the SDRAM in bank 1 when the CLK signal rises. At this time, the CS0 signal is set to L; the RAS signal is set to H; the CAS signal is set to L; and the WE signal is set to L (write enabled). To access the SDRAM in bank 2, the CS1 signal instead of the CS0 signal is set to L (timings t3 and t4).

The access indicator module 10 uses the CLK, CS0, CS1, RAS, CAS, and WE signals to indicate the frequency of corresponding access types.

(2) Detailed Configuration of the Memory Module Indicator Device and Effects

Figure 4:
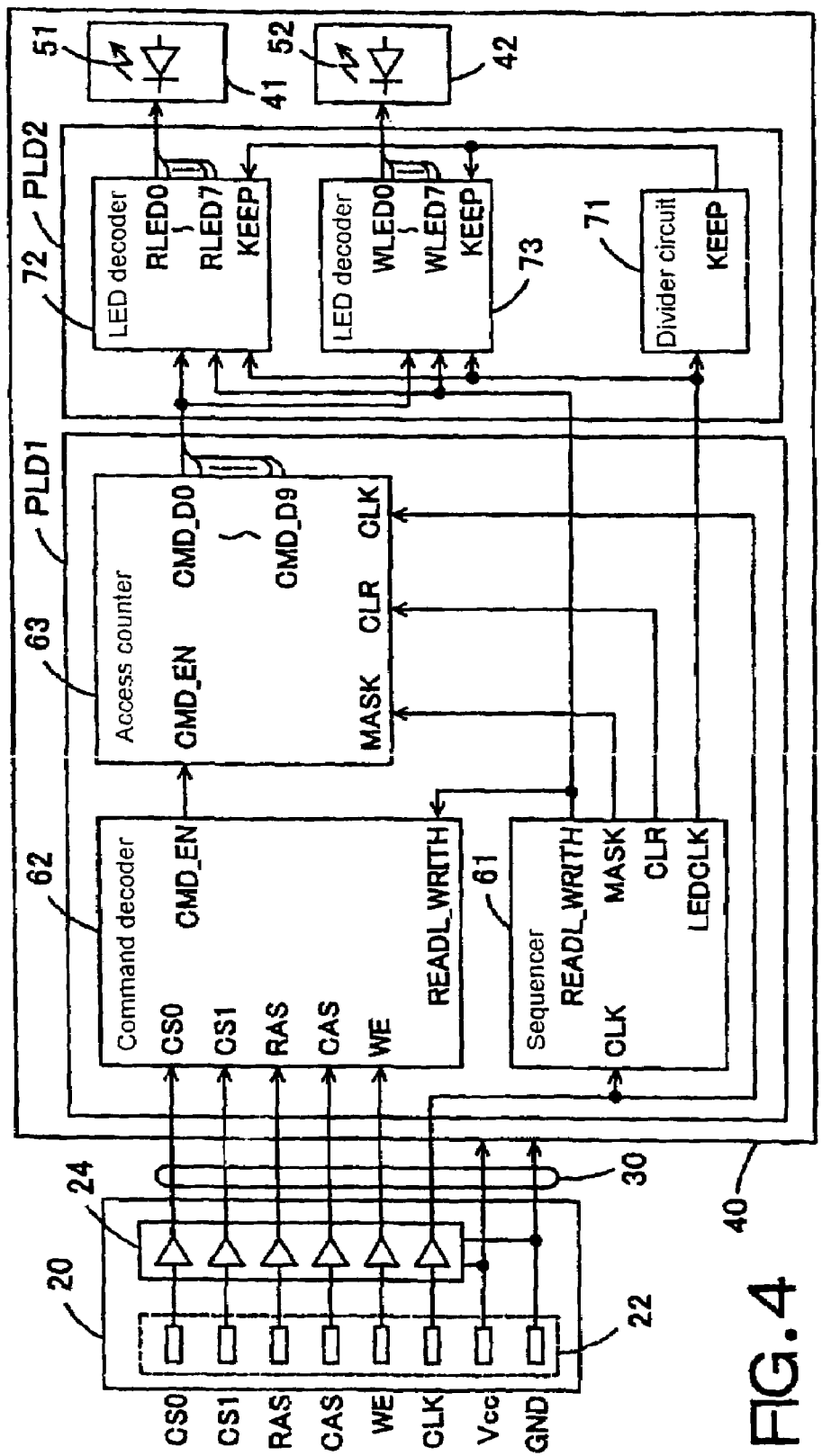
FIG. 4 outlines a configuration of an access indicator module 10.

FIG. 4 outlines a configuration of an access indicator module 10. The adapter 20 receives the CS0, CS1, RAS, CAS, WE, and CLK signals from the PC via the connection terminal 22 and transfers these signals to the corresponding buffer gates of the driver IC. The adapter 20 then outputs the buffered signals to the indicator unit section 40 via the signal cable 30. Since the signals are used via the buffer circuit, it becomes possible to indicate the frequency of accesses to the SDRAM without affecting memory module operations. The connection terminal 22 is also connected to power line Vcc and ground line GND. Therefore, the connection terminal 22 supplies power voltage from the PC to the driver IC and to the indicator unit section 40 via the signal cable 30.

The indicator unit 40a contains the major part of the indicator circuit according to the present invention. Consequently, it is unnecessary to use signal cables to transmit signals for lighting the individual LEDs. It is possible to decrease the number of signal cables.

The indicator unit section 40 is mounted with two programmable logic devices PLD1 and PLD2, a read operation indicator section 41, and a write operation indicator section 42 on a printed circuit board. For example, MAX7000 series PLDs such as Altera Corporation's EPM7032 can be used for PLD1 and PLD2. A hardware description language according to a specified format is used to build various circuits 61 through 63 and 71 through 73 in PLD1 and PLD2.

Figure 5:
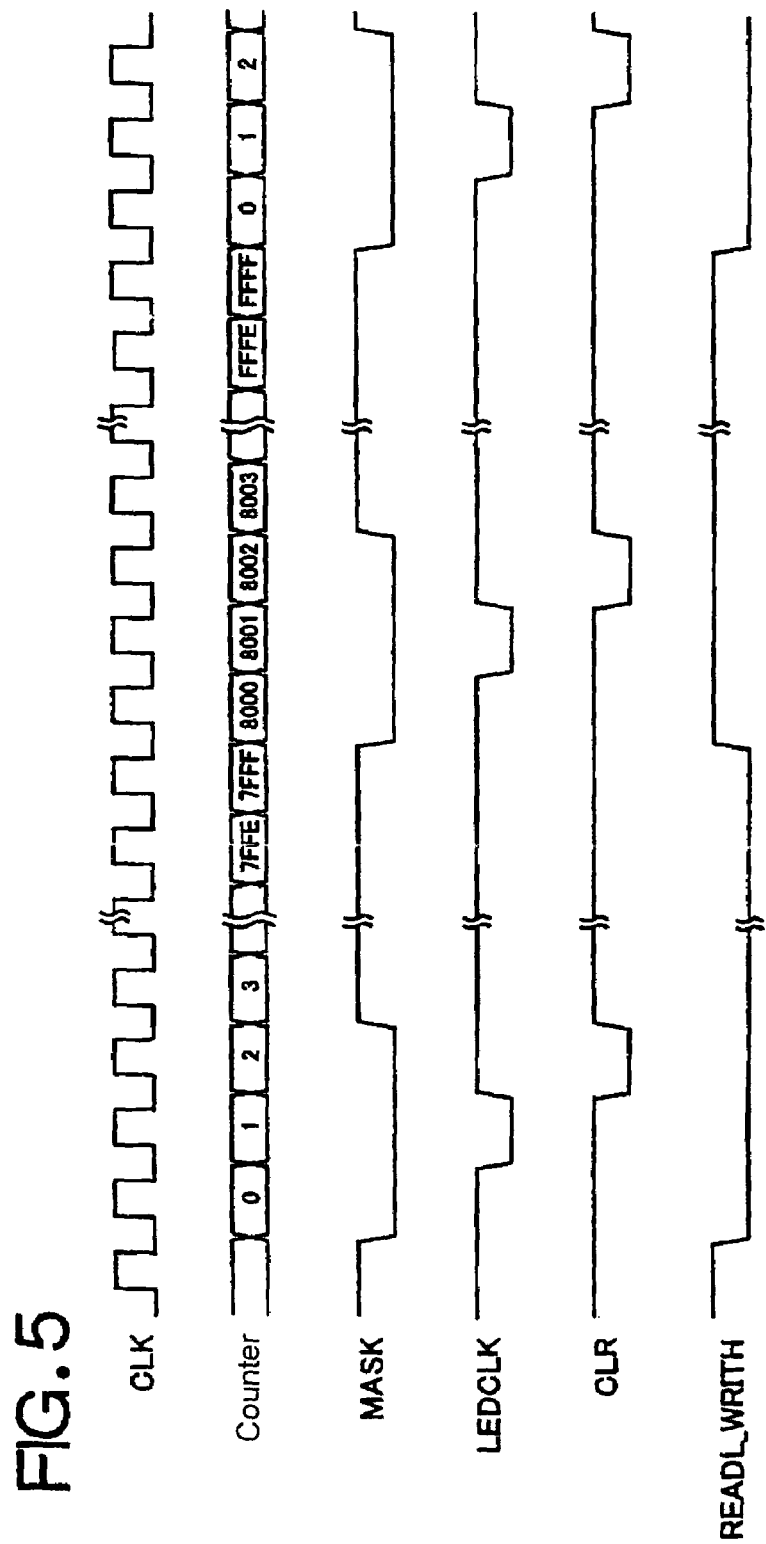
FIG. 5 is a timing chart showing operation timings of a sequencer.

FIG. 5 shows operation timings of a sequencer 61. FIG. 6 shows a data table T1 that maintains correspondence between a 16-bit counter provided for the sequencer 61 and an output timing of each signal. The sequencer 61 receives a CLK signal (e.g., 200 MHz) supplied to the memory module 80. The sequencer 61 generates a READL_WRITH signal and outputs it to a command decoder 62 and LED decoders 72 and 73. The sequencer 61 generates a negative-logic MASK signal and a negative-logic CLR signal and outputs them to an access counter 63. The sequencer 61 generates a negative-logic LEDCLK signal and outputs it to a divider circuit 71 and LED decoders 72 and 73. When the READL_WRITH signal is set to L, the period is assumed to count the frequency of reading from the SDRAM. When the READL_WRITH signal is set to H, the period is assumed to count the frequency of writing to the SDRAM.

The counter provided for the sequencer 61 is incremented by 1 each time the rising CLK signal is detected. The counter returns to "0000" next to "FFFF" in the hexadecimal notation. At the initial state set to "0000", the sequencer 61 sets a MASK signal output to L, an LEDCLK signal output to H, a CLR signal output to H, and a READL_WRITH signal output to L according to the table T1. The sequencer 61 then sets the LEDCLK signal to L at "0001" and to H at "0002". The sequencer 61 sets the CLR signal to L at "0002" and to H at "0003". The sequencer 61 sets the MASK signal to H at "0003" and to L at "8000". The sequencer 61 sets the READL_WRITH signal to H at "8000". The sequencer 61 sets the LEDCLK signal to L at "8001" and to H at "8002". The sequencer 61 sets the CLR signal to L at "8002" and to H at "8003". The sequencer 61 sets the MASK signal to H at "8003".

When the counter returns to "0000", the above-mentioned sequence is repeated.

The highest-order bit of the counter can be used for the READL_WRITH as is.

In this manner, the state of the READL_WRITH signal changes between L and H every "8000" counts (e.g., every 164 μsec). The MASK signal remains to be L only for "3" counts from the time point when the READL_WRITH signal changes. The LEDCLK signal becomes L "1" count after the MASK signal becomes L. The LEDCLK signal remains to be L only for "1" count while the MASK signal is L. The CLR signal becomes L "1" count after the LEDCLK signal becomes L. The CLR signal remains to be L only for "1" count while the MASK signal is L.

Accesses to the SDRAM are counted during a specified period in which the MASK signal is set to H.

The READL_WRITH signal becomes a count division signal (count signal) whose state alternates between H (write count state) and L (read count state) every specified period corresponding to the above-mentioned period equivalent to a division of the CLK signal.

This means that the sequencer 61 has a counting divider circuit to generate a count division signal using the CLK signal as input. The count division signal sequentially changes its state correspondingly to access types for every period corresponding to the above-mentioned specified period.

Figure 7:
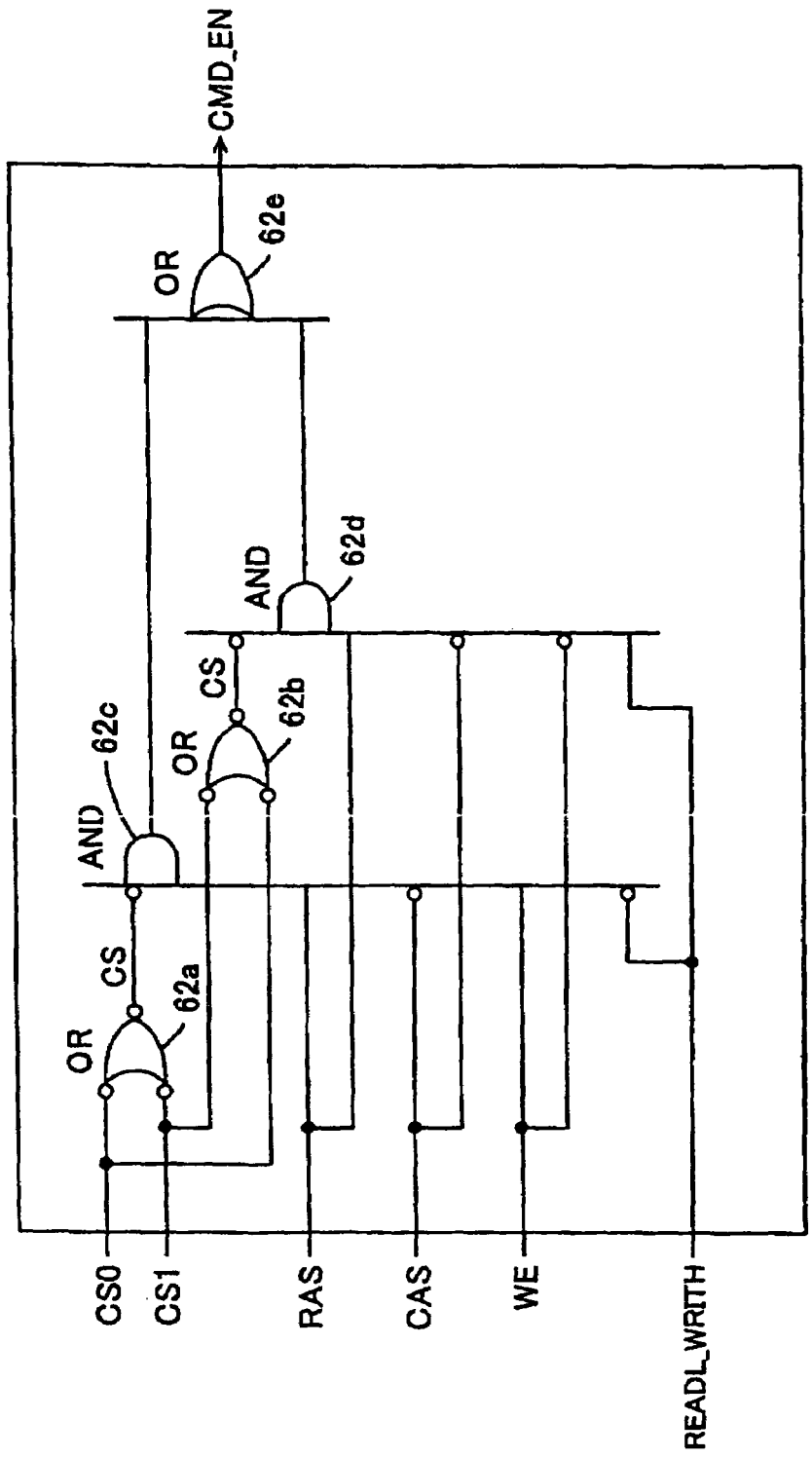
FIG. 7 is a circuit diagram showing a circuit configuration of a command decoder.

FIG. 7 shows a circuit configuration of the command decoder 62. A white dot in the drawing signifies an inverted input or output. The same applies to the following description.

The command decoder 62 has gate circuits 62a through 62e. The command decoder 62 is supplied with the CS0, CS1, RAS, CAS, and WE signals supplied to the memory module 80 as well as the READL_WRITH signal. The command decoder 62 generates a positive logic CMD_EN signal and outputs it to the access counter 63. Setting the CMD_EN signal to H counts the frequency of accesses to the SDRAM.

The CS0 and CS1 signals are inverted and are input to the OR gates 62a and 62b. Both logical additions are inverted and are output to the AND gates 62c and 62d. When bank 1 or 2 is selected, the CS0 or CS1 signal becomes L. In this case, the OR gates 62a and 62b output the CS signals both set to L. When neither bank 1 nor 2 is selected, both the CS0 and CS1 signals become H. In this case, the OR gates 62a and 62b output the CS signals both set to H.

FIG. 8 shows a function table indicating states of the CS, RAS, CAS, WE, and READL_WRITH signals as input and those of the CMD_EN signal as output when the command decoder 62 generates the CMD_EN signal. Symbol "X" indicates a don't care condition of the signal. The same applies to the following description. As shown in FIG. 8, the CMD_EN signal becomes L when the CS signal is H (unselected), the RAS signal is L, or the CAS signal is H. The CMD_EN signal becomes H when the CS signal is L, the RAS signal is H, and the CAS signal is L and when the WE signal and the READL_WRITH signal indicate different voltage levels. The CMD_EN signal becomes L when the CS signal is L, the RAS signal is H, and the CAS signal is L and when the WE signal and the READL_WRITH signal indicate the same voltage level.

According to the above-mentioned configuration, as shown in FIG. 3, the CMD_EN signal becomes H when the CS0 or CS1 signal is L, the RAS signal is H, and the CAS signal is L, when the READL_WRITH signal is L and the WE signal is H, and when the READL_WRITH signal is H and the WE signal is L.

Figure 9:
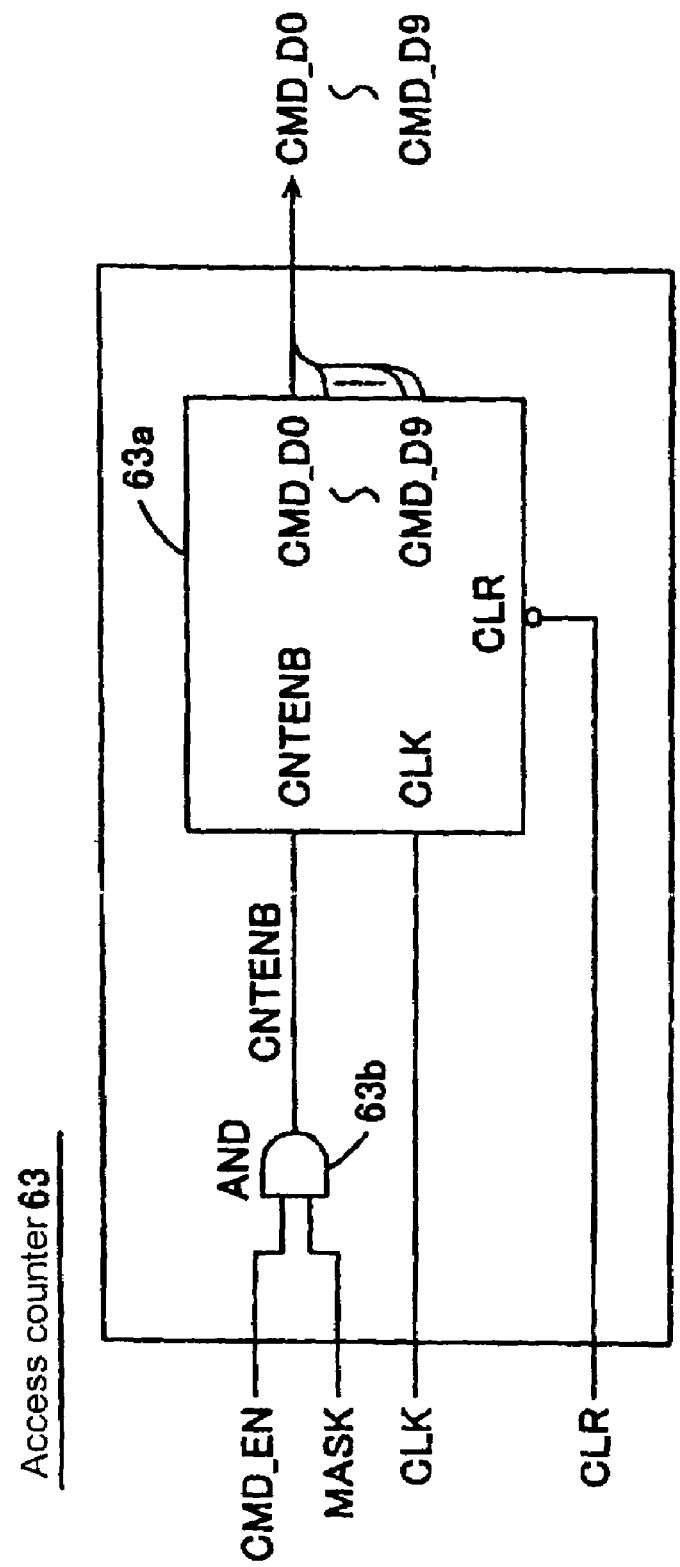
FIG. 9 is a circuit diagram showing a circuit configuration of an access counter.

FIG. 9 shows a circuit configuration of the access counter (common counter circuit) 63. The access counter 63 has a 10-bit counter 63a and an AND gate 63b. The access counter 63 receives the CLK signal supplied to the memory module 80, the MASK and CLR signals from the sequencer 61, and the CMD_EN signal from the command decoder 62. The access counter 63 generates 10-bit count signals CMD_D0 through CMD_D9 and outputs them to the LED decoders 72 and 73. Here, the CMD_D0 signal corresponds to the lowest-order bit. The CMD_D9 signal corresponds to the highest-order bit. The CLR signal, when set to L, resets the 10-bit counter to 0.

The CMD_EN signal and the MASK signal are input to the AND gate 63b. The logical multiplication of both becomes a CNTENB signal that is input to the counter 63a.

It is possible to use various general-purpose counter ICs and counter circuits for the counter 63a.

FIG. 10 shows a function table indicating states of the CMD_EN, MASK, CLR, and CLK signals as input and those of the CMD_D0 through CMD_D9 signals as output when the access counter 63 generates the CMD_D0 through CMD_D9 signals. As shown in FIG. 10, when the CLR signal is L (reset-on state), all bits of the 10-bit counter are reset to 0s. The 10-bit counter is incremented by 1 when the CLR signal is H (reset-off state), the CMD_EN signal is H, the MASK signal is H (mask-off state), and the CLK signal rises. The counter is reset to 0 when the counter's upper bound is exceeded. The specified period represented by the MASK signal is configured so as not to exceed the counter's upper bound. The 10-bit counter stops counting when the CLR signal is H and the CMD_EN or MASK signal is L.

If the READL_WRITH signal is H (write count state), the CMD_EN signal becomes H only during the specified period in which the CS0 or CS1 signal is L (selected) and the MASK signal is H (mask-off state) and when the WE signal is L (write enabled) In this case, the 10-bit counter is incremented when the RAS signal is H, the CAS signal is L, the CLR signal is H (reset-off state), and the CLK signal supplied to the memory module 80 rises. If the CS0 or CS1 signal is L the instant that the CLK signal rises, this means that the module 10 inputs a select signal indicative of the selection state.

This makes it possible to count the number of data write operations while measuring the frequency of data writing.

If the READL_WRITH signal is L (read count state), the CMD_EN signal becomes H only during the specified period in which the CS0 or CS1 signal is L (selected) and the MASK signal is H (mask-off state) and when the WE signal is H (write disabled) In this case, the 10-bit counter is incremented when the RAS signal is H, the CAS signal is L, the CLR signal is H (reset-off state), and the CLK signal supplied to the memory module 80 rises.

This makes it possible to count the number of data read operations while measuring the frequency of data reading.

As mentioned above, the access counter 63 uses the 10-bit counter to count the number of inputs of the select signal indicative of the selection state from the PC when the WE signal is L to enable writing during the specified period in which the READL_WRITH signal maintains the write count state. The access counter 63 uses the 10-bit counter to count the number of inputs of the select signal indicative of the selection state from the PC when the WE signal is H to disable writing during the specified period in which the READL_WRITH signal maintains the read count state. In this manner, the access counter 63 counts the number of accesses to the SDRAM independently of access types.

The same counter circuit is used to count the number of accesses to the semiconductor memory independently of access types. This eliminates the need for providing counter circuits corresponding to access types, thus simplifying the counter circuit. When PLDs are used in this embodiment, for example, it is possible to decrease logics for the counter circuit.

Figure 11:
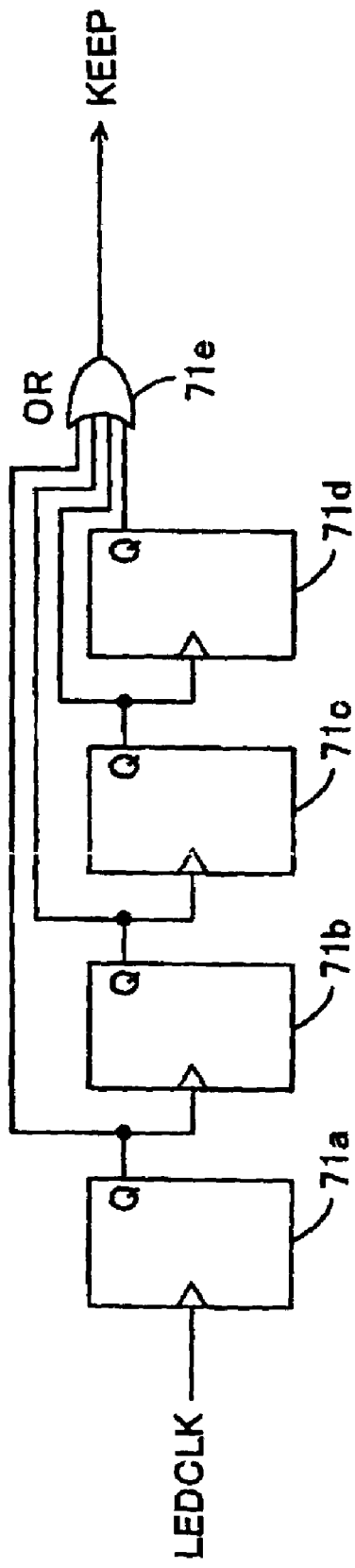
FIG. 11 is a circuit diagram showing a circuit configuration of a releasing divider circuit.

FIG. 11 shows a circuit configuration of the releasing divider circuit 71. The releasing divider circuit 71 comprises T flip-flops (T-FF) 71a through 71d and an OR gate 71e. The releasing divider circuit 71 receives the LEDCLK signal from the sequencer 61, generates a negative logic KEEP signal, and outputs it to the LED decoders 72 and 73. The KEEP signal represents the release state of a held indication corresponding to the maximum access frequency.

Figure 12:
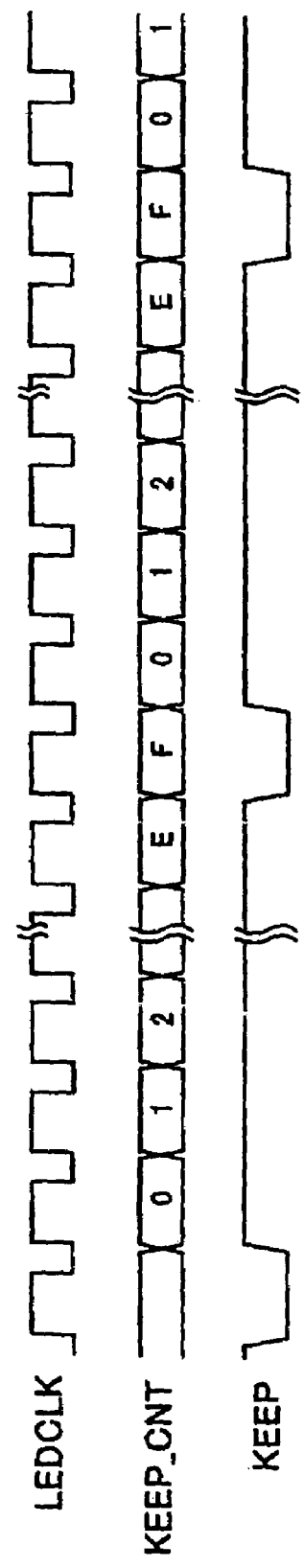
FIG. 12 is a timing chart showing operation timings of the releasing divider circuit.

As shown in FIG. 12, FF71a through FF71d are used as 4-bit counters. The counter is incremented by 1 when the LEDCLK rises. The counter is reset to 0 when the LEDCLK rises in response to hexadecimal F. Outputs Q from FF71a through FF71d are input to the OR gate 71e that produces the KEEP signal as the logical addition.

In this manner, the releasing divider circuit 71 generates the signal that represents the release state of a held indication corresponding to the maximum access frequency at a specified interval longer than the READL_WRITH signal cycle based on a division of the CLK signal.

It is possible to easily change an interval to set the KEEP signal to L by increasing or decreasing the number of T-FFs to change the number of bits.

Figure 13:
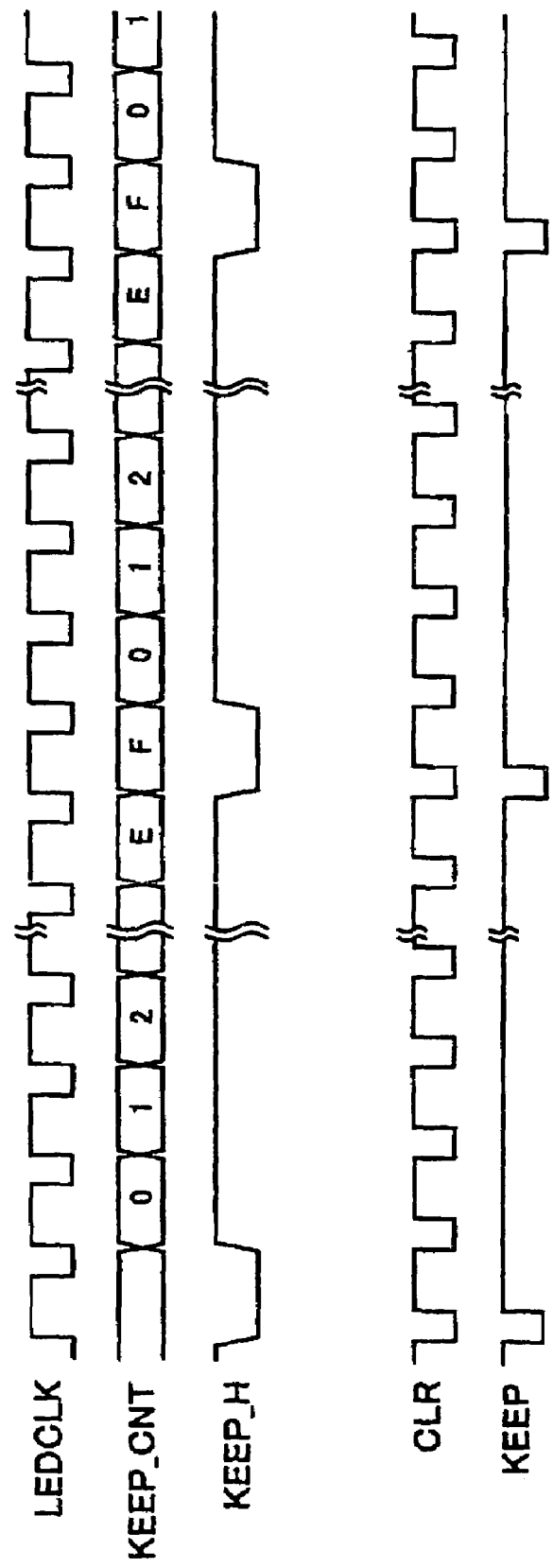
FIG. 13 is a timing chart showing operation timings of the releasing divider circuit according to a modification.

As shown in FIG. 13, it is possible to minimize an intermittent LED indication and improve the visibility by shortening the period in which the KEEP signal is L. To do this, it may be preferable to generate a KEEP_H signal output from the OR gate 71e, input the KEEP_H signal and the CLR signal to another OR gate, and use the logical addition of both as the KEEP signal.

Alternatively, it may be preferable to input the KEEP_H signal and the LEDCLK signal to another OR gate and use the logical addition of both as the KEEP signal.

It is possible to use various general-purpose counter ICs and counter circuits for the releasing divider circuit 71. When the LEDCLK signal is input to a 4-bit counter if used, the logical addition of 4-bit output can be used as the KEEP or KEEP_H signal.

Figure 14:
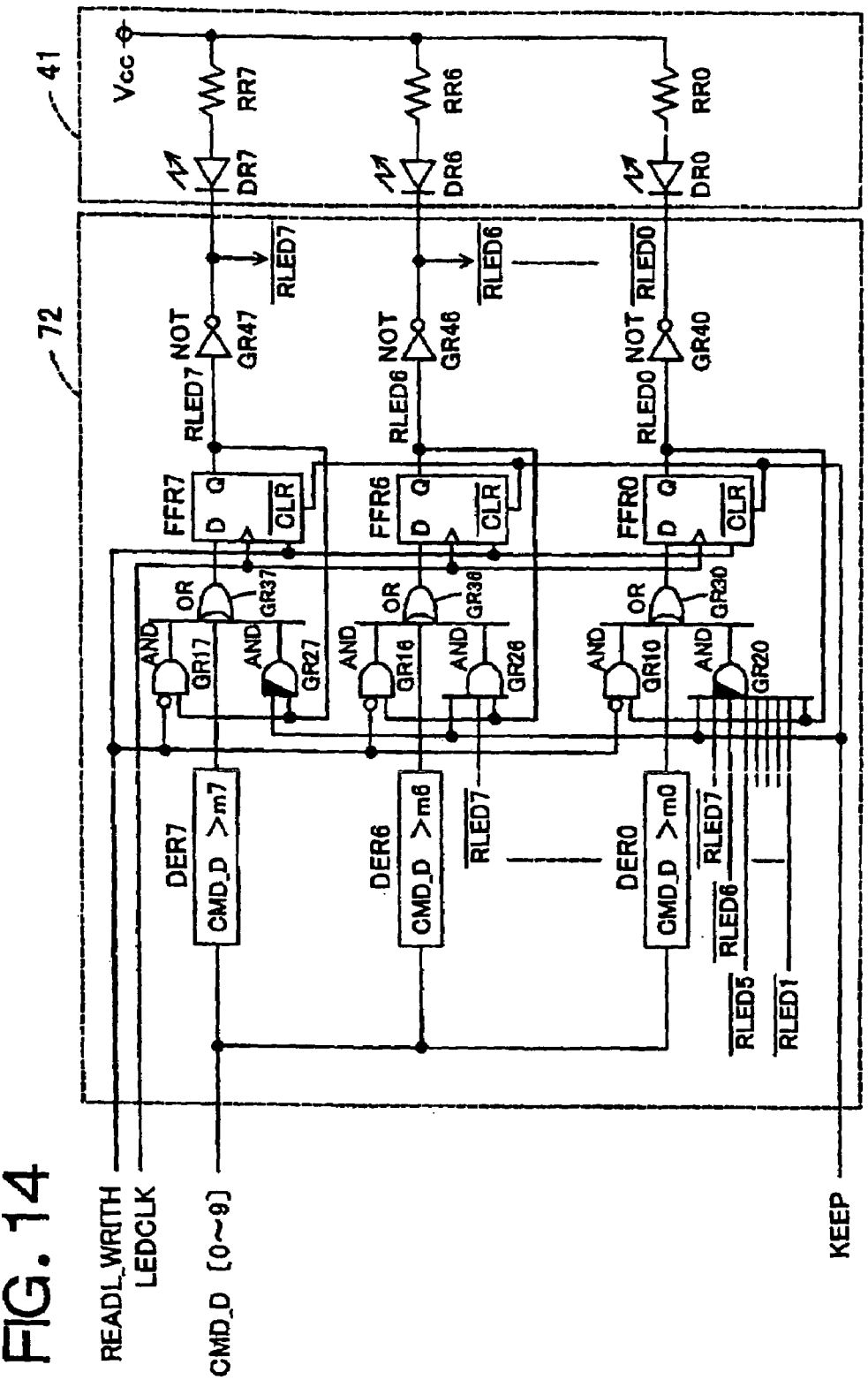
FIG. 14 is a circuit diagram showing a circuit configuration comprising an LED decoder and a read operation indicator section.
Figure 15:
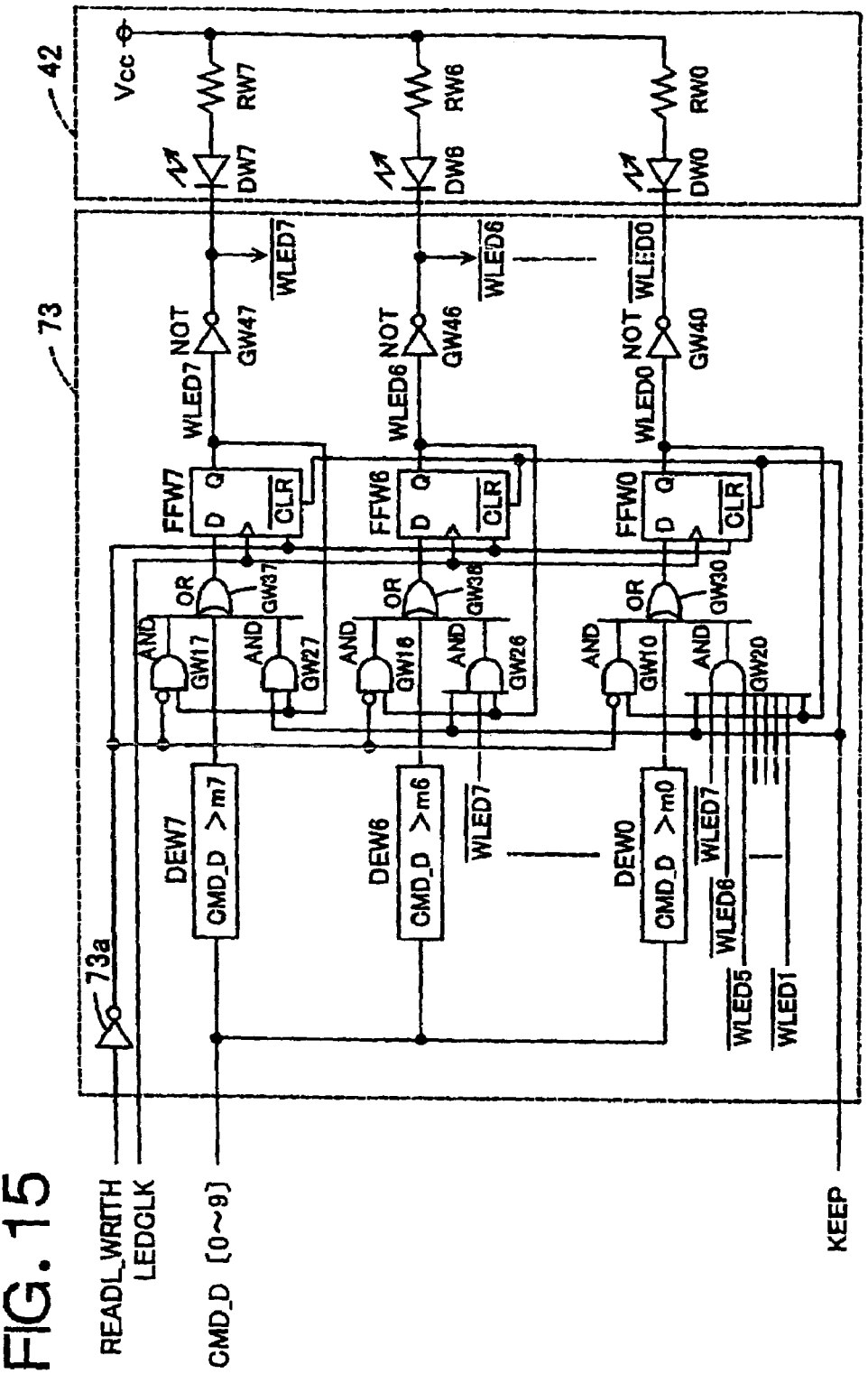
FIG. 15 is a circuit diagram showing a circuit configuration comprising the LED decoder and a write operation indicator section.

FIG. 14 shows a circuit configuration comprising an LED decoder 72 and the read operation indicator section 41. The LED decoder 72 lights eight read operation indicator LEDs 51. The read operation indicator section 41 includes the LEDs 51. FIG. 15 shows a circuit configuration comprising an LED decoder 73 and the write operation indicator section 42. The LED decoder 73 lights eight write operation indicator LEDs 52. The write operation indicator section 42 includes the LEDs 52. Both indicator sections 41 and 42 use the same configuration. Both LED decoders 72 and 73 use the same configuration except that the LED decoder 73 is provided with a NOT gate 73a to invert the READL_WRITH signal.

Figure 16:
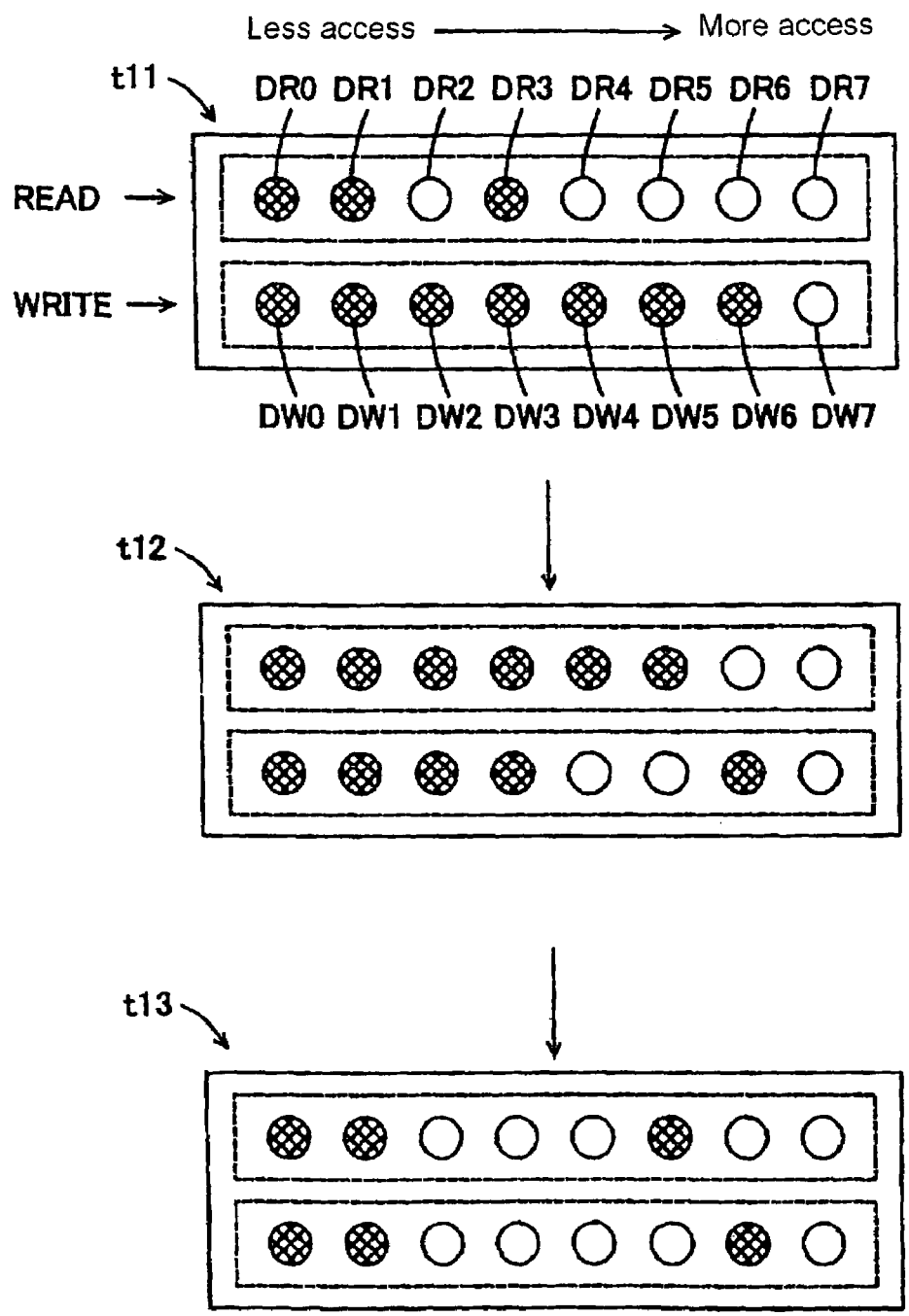
FIG. 16 shows indications of LEDs.

As shown in FIG. 16, the read operation indicator LEDs 51 are provided as DR0 through DR7 from the lowest to the highest order. The write operation indicator LEDs 52 are provided as DW0 through DW7 from the lowest to the highest order. The LEDs light from the lowest to the highest order for each access type. The number of activated LEDs corresponds to the access frequency.

The read operation indicator section 41 inputs the RLED0 through RLED7 signals (negative logic) from the LED decoder 72 to cathodes of DR0 through DR7. Pull-up resistors RW0 through RW7 are connected between the power line Vcc and anodes of DR0 through DR7, respectively. When any one of the negative logic RLED0 through RLED7 signals is L, the corresponding one of DR0 through DR7 turns on. When any one of the negative logic RLED0 through RLED7 signals is H, the corresponding one of DR0 through DR7 turns off. Also in the write operation indicator section 42, when any one of the negative logic RLED0 through RLED7 signals is L, the corresponding one of DR0 through DR7 turns on. When any one of the negative logic RLED0 through RLED7 signals is H, the corresponding one of DR0 through DR7 turns off.

Corresponding to the light emitting diodes DR0 through DR7, the LED decoder 72 comprises decoders DER0 through DER7, gate circuits GR10 through GR17, GR20 through GR27, GR30 through GR37, GR40 through GR47, and flip-flops FFR0 through FFR7. The LED decoder 72 receives the READL_WRITH signal and the LEDCLK signal from the sequencer 61; the CMD_D0 through CMD_D9 signals from the access counter 63; and the KEEP signal from the releasing divider circuit 71. The LED decoder 72 generates the negative logic RLED0 through RLED7 signals and outputs them to the read operation indicator section 41. In this manner, the read operation indicator section 41 uses the indicator elements corresponding to the access type, i.e., reading data from the SDRAM to indicate the frequency of this type of accesses to the SDRAM.

The decoders DER0 through DER7 have memories storing threshold values m0 through m7 to be compared with values of the 10-bit counter. Here, values m0 through m7 are decimal integers in the range $0 \leq m0 < m1 < \ldots < m7 \leq 1022$. The decoders DER0 through DER7 receive the CMD_D0 through CMD_D9 signals and compare count values represented by the corresponding signals with threshold values m0 through m7. When the count values are greater than threshold values m0 through m7, the decoders DER0 through DER7 generate H-state comparison signals and output them to the OR gates GR30 through GR37. When the count values are smaller than or equal to threshold values m0 through m7, the decoders DER0 through DER7 generate H-state comparison signals and output them to the OR gates GR30 through GR37. Of course, it may be preferable to generate H-state comparison signals when the count values are greater than or equal to the threshold values and to generate L-state comparison signals when the count values are smaller than the threshold values.

FIG. 17 shows a function table indicating count values (designated by CMD_D) represented by CMD_D signals as input and states of comparison signals (designated by DER0 through DER7) as output when the decoders DER0 through DER7 output comparison signals DER0 through DER7. As shown in FIG. 17, condition $CMD\_D \leq m0$ makes all comparison signals DER0 through DER7 to be L. Condition $m0 < CMD\_D \leq m1$ makes only the lowest-order comparison signal DER0 to be H. Condition $m1 < CMD\_D \leq m2$ makes successive comparison signals DER0 and DER1 to be H in the ascending order. After the similar sequence, condition $m7 < CMD\_D$ makes all comparison signals DER0 through DER7 to be H from the lowest to the highest order.

FFR0 through FFR7 are D flip-flops with the following conditioning function. When a KEEP signal input is L, the D flip-flops reset Q outputs to L. Only when a READL_WRITH signal input is H, and if the LEDCLK signal rises, the D flip-flops hold output states from the OR gates GR30 through GR37. If the LEDCLK signal does not rise, the D flip-flops hold states of the RLED0 through RLED7 signals as Q outputs. Even if the READL_WRITH signal is L, the D flip-flops hold the states of Q outputs. Let us consider the case of using a JK flip-flop having a negative logic CLR input terminal such as SN74107 by Texas Instruments Incorporated. The flip-flop is assumed to make the CLR input terminal to be H and keep holding an output from the Q terminal when both J and K terminals are set to be L. In this case, a preferable sequence is to input the KEEP signal to the CLR input terminal; input the LEDCLK signal to a clock input terminal; input the READL_WRITH signal to the K terminal; allow the AND gate to generate logical multiplication between outputs from the OR gates GR30 through GR37 and the READL_WRITH signal; and input the logical multiplication to the J terminal.

When the PLD hardware language is used, an if statement can be used to describe the function of FFR0 through FFR7.

When a KEEP signal input is L, FFR0 through FFR7 make RLED0 through RLED7 as Q outputs to be L. When a KEEP signal input is H, FFR0 through FFR7 latch OR gate outputs GR30 through GR37 as D inputs if a READL_WRITH signal input is H and the LEDCLK signal changes from L to H. When a READL_WRITH signal input is L, FFR0 through FFR7 hold the states of RLED0 through RLED7 as Q outputs even if the LEDCLK signal changes from L to H.

The Q outputs from FFR0 through FFR7 become positive logic signals RLED0 through RLED7 and are input to the corresponding NOT gates GR40 through GR47. The inverted signals become negative logic signals RLED0 through RLED7 and are input to cathodes of DR0 through DR7.

The READL_WRITH signal from the sequencer 61 is inverted and is input to the AND gates GR10 through GR17. The Q outputs from FFR0 through FFR7 are unchangedly supplied to the AND gates GR10 through GR17. The logical multiplication between the inverted READL_WRITH signal and the Q outputs from FFR0 through FFR7 is input to the OR gates GR30 through GR37. The RLED0 through RLED7 signals, i.e., the Q outputs from FFR0 through FFR7, are also input to the AND gates GR20 through GR27. The KEEP signal from the releasing divider circuit 71 is also input to the AND gates GR20 through GR27.

The AND gate FFR6, the second from the highest order, is supplied with not only the positive logic RLED6 and KEEP signals, but also the higher negative logic RLED7 signal. The logical multiplication of these signals is input to the OR gate GR36. Though not shown, the AND gate FFR5, the third from the highest order, is supplied with not only the positive logic RLED5 and KEEP signals, but also the higher negative logic RLED6 and RLED7 signals. The logical multiplication of these signals is input to the OR gate GR36. The similar process continues. Finally, the lowest AND gate FFR0 is supplied with not only the positive logic RLED0 and KEEP signals, but also the higher negative logic RLED1 through RLED7 signals. The logical multiplication of these signals is input to the OR gate GR30.

Output signals from the decoders DER0 through DER7, output signals from the AND gates GR10 through GR17, and output signals from the AND gates GR20 through GR27 are input to the OR gates GR30 through GR37. The logical multiplication of these signals is input to D of FFR0 through FFR7.

FIG. 18 shows a function table indicating states of READL_WRITH, DERi, positive logic RLEDi, KEEP, negative logic RLEDj, and LEDCLK signals as input and states of an RLEDi signal (positive logic) as output when the LED decoder 72 generates positive logic signals RLED0 through RLED7. In this table, i is any one of integers 0 through 7, and j represents all integers i+1 through 7 when i is smaller than or equal to 6. The column for the negative logic RLEDj signal contains symbol (L) indicating that any of RLEDj signals is in the L state.

As shown in FIG. 18, when the KEEP signal is L (released), the FFR0 through FFR7 signals make Q outputs to be L independently of the other signals' states. The RLED0 through RLED7 signals become L. As a result, all read operation indicator LEDs turn off.

The following describes the case where the KEEP signal is H.

When the READL_WRITH signal is L (read count state), FFR0 through FFR7 hold Q outputs independently of states of the other signals except the KEEP signal. Therefore, FFR0 through FFR7 hold the states of the RLED0 through RLED7 signals as Q outputs even if the LEDCLK signal changes from L to H. As a result, all read operation indicator LEDs keep their lighting states unchanged. When the LED-CLK rises with the READL_WRITH reset to L, the MASK signal is L (mask state) and the CLR signal falls as shown in FIG. 5. The access counter 63 outputs the number of write operations from the SDRAM without resetting. Therefore, FFR0 through FFR7 need not hold the states of DERi signals.

The following describes the case where the READL_WRITH signal is H (write count state). When the LEDCLK rises with the READL_WRITH set to H, the MASK signal is L (mask state) and the CLR signal falls as shown in FIG. 5. The access counter 63 outputs the number of read operations from the SDRAM without resetting.

When the access counter shows a small number of counts, the DERi shows the L state, and the positive logic RLEDi signal also shows the L state (LED turned off), outputs from the AND gates GR10 through GR17 and GR20 through GR27 all indicate the L state. Accordingly, outputs from the OR gates GR30 through GR37 become L independently of the states of the higher negative logic RLEDj signals. In this case, when the LEDCLK signal rises, FFR0 through FFR7 latch the L-state D inputs. The RLED0 through RLED7 signals as Q outputs become L (LEDs turned off).

When the access counter shows an increased number of counts and the DERi shows the H state, outputs from the OR gates GR30 through GR37 indicate the H state independently of the state of the positive logic RLEDi signal or the negative logic RLEDj signal. In this case, when the LED-CLK signal rises, FFR0 through FFR7 latch the H-state D inputs. The RLED0 through RLED7 signals as Q outputs become H (LEDs turned on). The example in FIG. 16 shows that DR2, DR4, and DR5 change from the off-state at timing t11 to the on-state at timing t12.

Even if the access counter shows a decreased number of counts and the DERi signal becomes L, the RLEDi signal may show the H state and all the higher-order negative logic RLEDj signals may show the H state (LEDs turned off). In this case, outputs from the AND gates GR20 through GR27 become H. Outputs from the OR gates GR30 through GR37 remain to be H. The negative logic RLEDj signal is not input to the highest AND gate GR27. An output from the positive logic RLEDi signal shows the state corresponding to that for the negative logic RLEDj set to H. In this case, when the LEDCLK signal rises, FFR0 through FFR7 latch the H-state D inputs. The states of RLED0 through RLED7 as Q outputs remain H (LEDs turned on). The example in FIG. 16 shows that DR5 remains turned on at timings t12 and t13 when the higher-order DR6 and DR7 are turned off.

In this manner, the peak hold function for read frequency can be implemented to hold the LED indication corresponding to the maximum frequency of reading from the SDRAM. Consequently, this makes it possible to recognizably indicate the frequency of reading data from the semiconductor memory. Situations to read data can be grasped easily, improving the convenience of using the memory module.

On the other hand, when the DERi signal is L, the RLEDi signal is H, and any of the higher-order negative logic RLEDj signals is L (LED turned on), outputs from the AND gates GR10 through GR17 and GR20 through GR27 all indicate the L state. Outputs from the OR gates GR30 through GR37 change to L. In this case, when the LEDCLK signal rises, FFR0 through FFR7 latch the L-state D inputs. RLED0 through RLED7 as Q outputs change to the L state (LEDs turned off). The example in FIG. 16 shows that DR3 and DR4 change from the on-state at timing t12 to the off-state at timing t13 when the higher-order DR5 is turned on.

When the access frequency exceeds the previous maximum access frequency, the indication for the maximum access frequency is updated. The example in FIG. 16 shows that the LED indicated for the maximum frequency changes from DR3 at timing t11 to DR5 at timing t13.

Thereafter, the indication corresponding to the maximum frequency of reading from the SDRAM is reset at the timing when the KEEP signal becomes L (release state). Accordingly, DR6 in FIG. 16 becomes turned off when the KEEP signal becomes L. Since it is configured to periodically release the state of a held indication corresponding to the maximum frequency of reading from the semiconductor memory, the data read frequency can be easily manage.

During a specified period of the read count state, the access indicator module 10 according to the above-mentioned configuration uses the common access counter to count the number of operations to read data from the SDRAM. When the specified period terminates, the access indicator module 10 turns on as many read operation indicator LEDs as the number of counted operations.

The similar process can be applied to another type of access, i.e., writing data to the SDRAM. That is to say, the write operation indicator section 42 uses the indicator elements corresponding to the write access type to indicate the frequency of write access to the DRAM.

FIG. 19 shows a function table indicating states of READL_WRITH, DEWi, positive logic WLEDi, KEEP, negative logic WLEDj, and LEDCLK signals as input and states of a WLEDi signal (positive logic) as output when the LED decoder 73 generates positive logic signals WLED0 through WLED7. As shown in FIG. 15, the NOT gate 73a inverts the READL_WRITH signal. Consequently, the READL_WRITH signal in FIG. 19 shows states reverse to those of the same signal in the function table of FIG. 18. Except the NOT gate 73a, the configuration of the LED decoder 73 is the same as that of the read operation indicator LED decoder 72. States of the signals other than READL_WRITH are the same as those in the function table of FIG. 18.

During a specified period of the read count state, the access indicator module 10 according to the above-mentioned configuration uses the common access counter to count the number of operations to write data to the SDRAM. When the specified period terminates, the access indicator module 10 turns on as many write operation indicator LEDs as the number of counted operations. In this manner, the peak hold function for write frequency can be implemented to hold the LED indication corresponding to the maximum frequency of writing to the SDRAM. Consequently, this makes it possible to recognizably indicate the frequency of writing data to the semiconductor memory, improving the convenience of using the memory module.

Figure 20:
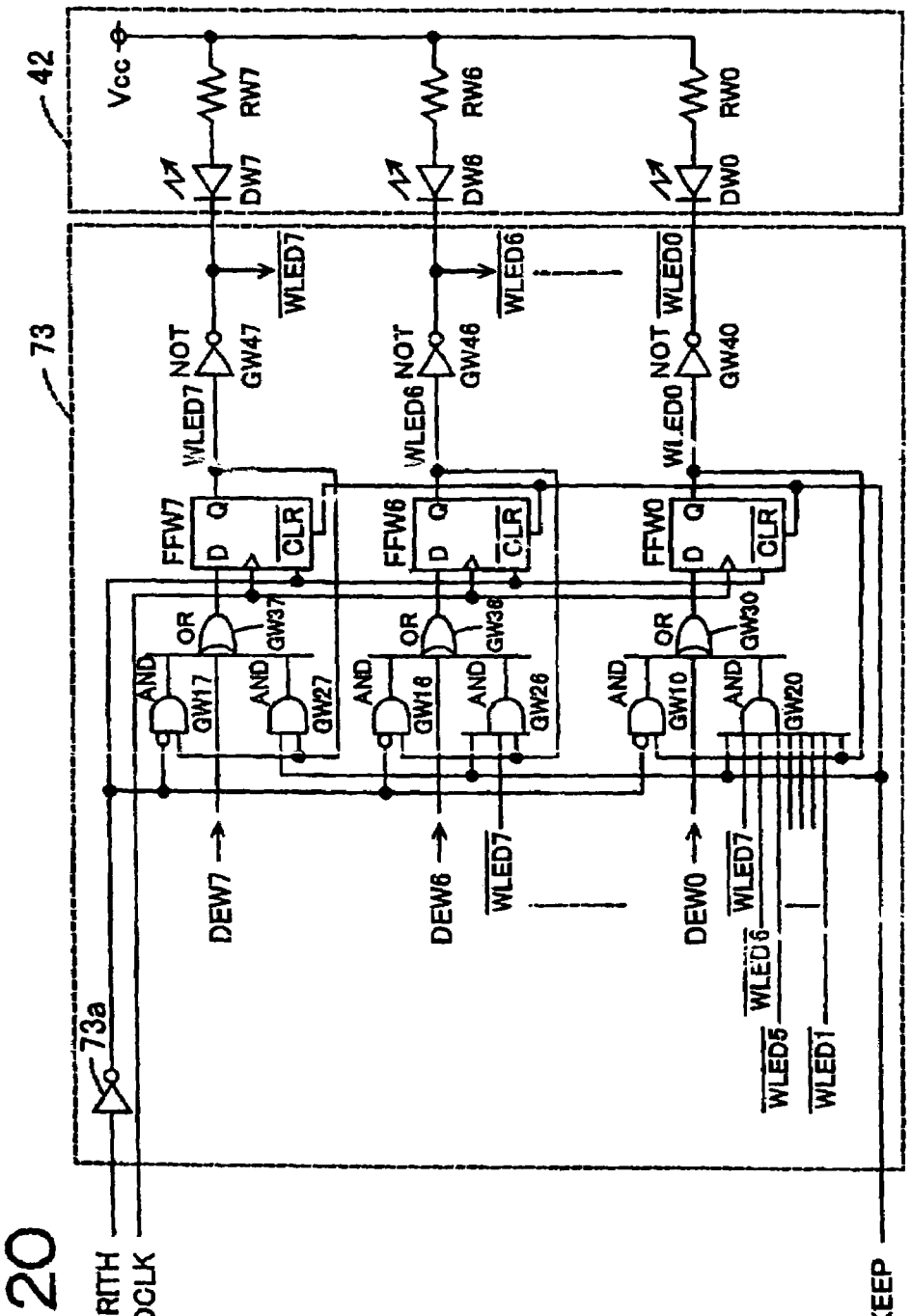
FIG. 20 is a circuit diagram showing a circuit configuration comprising the LED decoder and the write operation indicator section according to a modification.

As shown in FIG. 20, the same operations and effects are also available by inputting outputs from DER0 through DER7 of the read operation indicator LED decoder 72 to the OR gates GW30 through GW37 of the write operation indicator LED decoder 73. Not only the access counter, but also the decoder can be used commonly. It is possible to simplify the LED decoders constituting the indicator circuit. When the PLDs are used, the number of logics can be decreased.

As mentioned above, the access indicator module according to the present invention operates when the connection terminal 22 is connected to the motherboard connector 91 and the memory module connection terminal 82 is connected to the connector 23. The CLK signal supplied to the memory module is used to separate the period to measure the frequency of reading data from the SDRAM and the period to measure the frequency of writing data to the SDRAM. The access frequency is measured for each access type. In this manner, the access indicator module indicates the access frequency using indicator elements corresponding to the access type. It becomes possible to easily identify what type of access is made to the semiconductor memory mounted on the memory module. This makes it possible to improve the convenience of using the memory module. The semiconductor memory is accessed much faster than magnetic recording media such as magnetic disks. The access indicator module can be used to easily identify the frequency of access to such semiconductor memory, further improving the convenience in this respect.

The access indicator module uses indicator elements corresponding to the access type to not only indicate the frequency of the type of access to the semiconductor memory, but also hold the indication corresponding to the maximum frequency of the access. It becomes possible to easily identify the indication corresponding to the frequency of access to the semiconductor memory. Consequently, it becomes more easily to understand situations of access to the semiconductor memory. Also in this respect, it is possible to improve the convenience of using the memory module.

Moreover, the access indicator module operates in synchronization with the CLK signal for the memory module independently of CLK signal's frequency.

As mentioned above, the access indicator module is available as an adapter. Even a memory module without any indicator unit can be connected to the computer via the access indicator module. It is possible to provide an indication of the access frequency while the memory module operates as usual.

(3) Modifications

The present invention may be embodied in various modifications.

The ECC (Error Correction Code) may or may not be provided for the memory module mounted with the semiconductor memory to indicate the access frequency. The memory module can be sized to various memory capacities and may be mounted with SIMM and the like as well as DIMM. The present invention can be applied to the memory module comprising one bank by using the CS0 or CS1 signal for the above-mentioned CS signal as is. The present invention can be applied to the memory module comprising three or more banks by generating the CS signal from a plurality of select signals.

The circuits 61 through 63 and 71 through 73 may be provided not only in the indicator unit, but also on the adapter partially or wholly. When the sequencer and the command decoder is provided on the adapter, for example, it just needs to transmit the CLK, CMD_EN, READL_WRITH, MASK, CLR, and LEDCLK signals via signal cables. It is unnecessary to transmit signals for individually turning on the LEDs using the signal cables, thus decreasing the number of signal cables.

Separate access counters may be provided for the read access indication and the write access indication. Though the circuits increase, it becomes possible to more accurately indicate the access frequency corresponding to the access type.

It may be also preferable to provide indicator elements corresponding to the other access types such as deletion and verification of data in the semiconductor memory and use the corresponding indicator elements to indicate the frequency of these types of accesses. It is possible to easily confirm whether or not the data deletion or verification is an intended operation, thus further improving the convenience.

It may be also preferable to eliminate the peak hold function and use indicator elements corresponding to the access type to indicate the frequency of that type of access to the semiconductor memory. This modification is also included in the present invention.

It may be also preferable to indicate a summary of the frequency of all accesses and hold the indication of the maximum frequency of all accesses. This modification is also included in the present invention.

As mentioned above, the present invention can improve the convenience of using memory modules according to various embodiments.

I claim:

1. A memory module indicator device having an indicator circuit using an indicator element to indicate situation of access to readable and writable semiconductor memory mounted on a standardized memory module connected to a computer, the indicator element is provided corresponding to a type of access to the semiconductor memory;

the indicator circuit uses the indicator element corresponding to the access type to indicate frequency of the type of access to the semiconductor memory; and wherein the indicator circuit counts the number of accesses to the semiconductor memory for the access type during a specified period and uses the indicator element corresponding to the access type to provide an indication corresponding to the number of counted accesses.

2. The memory module indicator device according to claim 1, wherein the indicator circuit uses the indicator element corresponding to the access type to indicate frequency of the type of access to the semiconductor memory and holds an indication corresponding to the maximum frequency of the access.

3. The memory module indicator device according to claim 1, wherein the computer is mounted with a general-purpose motherboard connector and the memory module is mounted with a memory module connection terminal connectable to the motherboard connector; wherein the memory module indicator device is provided with a connection terminal having the same shape as the memory module connection terminal and is provided with a connector having the same shape as the motherboard connector; and wherein the indicator circuit uses the indicator element corresponding to the access type to indicate frequency of the type of access to the semiconductor memory when the connection terminal is connected to the motherboard connector and the memory module connection terminal is connected to the connector.

4. The memory module indicator device according to claim 1, wherein the indicator circuit comprises a common counter circuit to count the number of accesses independently of the access types; wherein the indicator circuit receives a specified clock signal and generates a count signal whose state accordingly varies with the access type for each period corresponding to the specified period; and wherein, during the specified period, the indicator circuit uses the common counter circuit to count the number of accesses of the type corresponding to a state of the count signal and, after termination of the specified period, uses the indicator element corresponding to the access type to perform indication corresponding to the number of counted accesses.

5. The memory module indicator device according to claim 1, wherein there is provided a plurality of the indicator elements for each of the access types; wherein the indicator circuit turns on indicator elements corresponding to the access type; and wherein the number of the indicator elements corresponds to the number of counted accesses.

6. The memory module indicator device according to claim 4, wherein the access type comprise writing to the semiconductor memory and reading from the semiconductor memory; wherein the memory module accesses the semiconductor memory in synchronization with a pulse clock signal input from the computer, receives a select signal indicative of a selection state of the semiconductor memory from the computer, and accesses the semiconductor memory correspondingly to the state of a write enable signal which is input from the computer to indicate whether or not to enable writing; wherein the indicator circuit comprises: a common counter circuit to count the number of accesses independently of the access types; and a counting divider circuit to divide the clock signal and to generate a count division signal which changes alternately between a write count state and a read count state during each period corresponding to the specified period, wherein, when the count division signal shows a write count state.

7. The memory module indicator device according to claim 1,
wherein each of the indicator elements represents a specified number of accesses;
wherein the indicator circuit comprises:
a counter circuit which counts the number of accesses to the semiconductor memory during a specified period; and
a counting divider circuit which divides specified clock signals and generates a count division signal which changes alternately between a write count state and a read count state, each period corresponds to the specified period,
wherein, the indicator circuit uses the counter circuit during each specified period corresponding to the state of the count division signal, thus causing the counter circuit to count the number of accesses of each access type, after termination of the specified period, turns on indicator elements corresponding to the access type so that the lighting indicator elements represents the counted number of accesses and hold lighting state of the indicator element which represents most significant number of accesses and was lighted just before the termination of the specified period, and makes all of the indicator elements corresponding to the access type turn off at a specified interval longer than the cycle of the count division signal.

8. The memory module indicator device according to claim 7,
wherein the indicator circuit comprises a releasing divider circuit which divides the clock signals and to generate a signal indicating a release state of a held indication corresponding to the maximum frequency of the access at a specified interval longer than the cycle of the count division signal,
wherein, when the signal indicating a release state is generated for the access type, the indicator circuit makes all of the indicator elements corresponding to the access type turn off.

* * * * *